United States Patent
Mukherjee et al.

(10) Patent No.: US 12,393,859 B2
(45) Date of Patent: Aug. 19, 2025

(54) NON-LINEAR DATA DEPENDENCY DETECTION IN MACHINE LEARNING USING HYBRID QUANTUM COMPUTING

(71) Applicant: Bank of America Corporation, Charlotte, NC (US)

(72) Inventors: Maharaj Mukherjee, Poughkeepsie, NY (US); Prashant Thakur, Gujarat (IN)

(73) Assignee: Bank of America Corporation, Charlotte, NC (US)

(*) Notice: Subject to any disclaimer, the term of this patent is extended or adjusted under 35 U.S.C. 154(b) by 696 days.

(21) Appl. No.: 17/838,347

(22) Filed: Jun. 13, 2022

(65) Prior Publication Data

US 2023/0401477 A1    Dec. 14, 2023

(51) Int. Cl.
| | | |
|---|---|---|
| G06N 10/60 | (2022.01) | |
| G06F 40/20 | (2020.01) | |
| G06N 10/80 | (2022.01) | |
| G06Q 30/0601 | (2023.01) | |
| H04L 51/02 | (2022.01) | |
| G06N 20/00 | (2019.01) | |

(52) U.S. Cl.
CPC ............ *G06N 10/60* (2022.01); *G06F 40/20* (2020.01); *G06N 10/80* (2022.01); *G06Q 30/0631* (2013.01); *H04L 51/02* (2013.01); *G06N 20/00* (2019.01)

(58) Field of Classification Search
CPC .................................................... G06N 10/60
USPC .......................................................... 706/62
See application file for complete search history.

(56) References Cited

U.S. PATENT DOCUMENTS

| | | | | |
|---|---|---|---|---|
| 6,137,909 A | * | 10/2000 | Greineder | G06F 18/211 |
| | | | | 382/190 |
| 10,504,197 B2 | * | 12/2019 | Boroczky | G16H 50/20 |
| 12,093,397 B1 | * | 9/2024 | Lin | G06F 21/577 |
| 12,293,841 B1 | * | 5/2025 | Luo | G16H 50/20 |
| 2008/0171916 A1 | * | 7/2008 | Feder | G16H 50/20 |
| | | | | 600/300 |

(Continued)

OTHER PUBLICATIONS

"Superconducting Circuits and Quantum Computation," https://www.rle.mit.edu/media/pr148/38.pdf, Retrieved on May 9, 2022.

(Continued)

*Primary Examiner* — Reza Nabi
(74) *Attorney, Agent, or Firm* — Weiss & Arons LLP

(57) ABSTRACT

Methods for detecting non-linear data dependencies in machine learning using hybrid quantum computing. Methods include receiving a selection of an accuracy metric. Methods include receiving a data set comprising a plurality of data elements for processing by a machine learning model operating on a machine learning system. Methods include identifying a plurality of data elements within each data set. Methods include identifying one or more features for each data element. Methods include determining a total number of features for the data set. Methods include reducing, by a quantum annealing method, based on the accuracy metric, the total number of features to a reduced number of features. Methods include inputting the reduced number of features into the machine learning model. Methods include outputting a result from the machine learning model.

7 Claims, 4 Drawing Sheets

(56) References Cited

U.S. PATENT DOCUMENTS

| | | | | |
|---|---|---|---|---|
| 2018/0046780 | A1* | 2/2018 | Graiver | G06F 40/44 |
| 2018/0101784 | A1* | 4/2018 | Rolfe | G06N 20/10 |
| 2018/0284758 | A1* | 10/2018 | Cella | H04L 67/12 |
| 2019/0041842 | A1* | 2/2019 | Cella | G01M 13/028 |
| 2020/0097859 | A1* | 3/2020 | Hu | G06F 9/3001 |
| 2022/0230090 | A1* | 7/2022 | Batta | G06N 20/00 |
| 2022/0245516 | A1* | 8/2022 | Kan | G06N 3/045 |
| 2023/0116332 | A1* | 4/2023 | Patil | G16H 20/40 |
| | | | | 705/2 |
| 2023/0148955 | A1* | 5/2023 | Kwon | A61B 5/055 |
| | | | | 382/131 |
| 2023/0281527 | A1* | 9/2023 | Cella | G06V 20/17 |
| | | | | 705/7.17 |
| 2023/0401477 | A1* | 12/2023 | Mukherjee | G06Q 30/0631 |
| 2024/0050006 | A1* | 2/2024 | Sharma | A61B 5/4088 |
| 2024/0220845 | A1* | 7/2024 | Burchard | G06F 11/3055 |
| 2024/0320296 | A1* | 9/2024 | Mariella | G06N 10/60 |
| 2024/0345123 | A1* | 10/2024 | Vakil | H02N 99/00 |

OTHER PUBLICATIONS

Farhi et al., "A Quantum Approximate Optimization Algorithm," Massachusetts Institute of Technology, Nov. 14, 2014.

Metropolis et al., "Equation of State Calculations by Fast Computing Machines," https://bayes.wustl.edu/Manual/EquationOfState.pdf, The Journal of Chemical Physics, Jun. 1953.

Kadowaki et al., "Quantum Annealing in the Transverse Ising Model," http://www.physics.rutgers.edu/~pchandra/physics681/Kadowaki_pre.pdf, Nov. 1998.

"Perspectives of Quantum Annealing: Methods and Implementations," https://dspace.mit.edu/bandle/1721.1/133680, Massachusetts Institute of Technology, 2020.

Brooke et al., "Quantum Annealing of a Disordered Magnet," American Association for the Advancement of Science, Apr. 30, 1999.

Sack et al., "Quantum Annealing Initialization of the Quantum Approximate Optimization Algorithm," https://quantum-journal.org/papers/g-2021-07-01-491/, Jul. 1, 2021.

Irie et al., "Hybrid Quantum Annealing via Molecular Dynamics," https://www.nature.com/articles/s41598-021-87676-z, Scientific Reports, Apr. 19, 2021.

* cited by examiner

NON-LINEAR DATA DEPENDENCY DETECTION IN MACHINE LEARNING USING HYBRID QUANTUM COMPUTING

FIELD OF TECHNOLOGY

Aspects of the disclosure relate to machine learning.

BACKGROUND OF THE DISCLOSURE

Machine learning systems are computers that utilize mathematical models to learn from both inputted data and experience. Typically, this learning occurs without direct instruction. Machine learning systems may imitate the way humans learn from information as well as the way humans learn from personal experience.

Machine learning systems may use a machine learning model. The machine learning model may be specifically designed to perform a predetermined task.

Machine learning models may classify data elements. In some machine learning models, a data element may be broken down into its component parts, also referred to herein as features. Upon feature identification, each identified feature as well as the group of classified features may be linked to a classification.

Current trends have encouraged continuously increasing the amount of data inputted into developing machine learning models. Many speculate that the robustness and developedness of the machine learning model is directly dependent on the quantity of the data absorbed by the model. Additionally, many also believe that the robustness and developedness of a machine learning model depend on the level of granularity of the features associated with an inputted data element.

However, it should be noted that the more data that is input into a model, the more resources and time the system will need in order to create, improve and enhance a machine learning model. It should be further noted that the more granularly the system reviews the inputted data, the more resources and time the system will need in order to create, improve and enhance the machine learning model. Therefore, in order to optimize a machine learning model and associated system, it would be desirable to ensure that the data inputted into the system is purely, or mostly, information that is advantageous to, and improves, the machine learning model and underlying system.

It should be noted that, for the purposes of this application, duplicate data may be understood to mean two data element sets that include the same, or very similar, information. An example of duplicate data may include a first set of data elements that includes a first name, a middle name and a last name and a second set of data elements that includes a full name. The first set of data elements may be considered duplicative to the second set of data elements.

Also, for the purposes of this application, highly correlated data may be understood to mean two data element sets that are closely related or two data element sets that are substantially, or completely, dependent on one another. An example of highly correlated data may include a first set of data elements that corresponds to a height and a width of a predefined item, and a second set of data elements that corresponds to a weight of the predefined item. The height and the width of the predefined item when compared to the weight of the predefined item may be considered highly correlated.

When duplicate data or highly correlated data is received at a machine learning system, the associated model may not learn, or may not learn significantly, from the inputted duplicate or highly correlated data. Therefore, both resources and time may be wasted on duplicate and highly correlated data inputted into, and processed at, a machine learning model.

As such, it would be desirable for systems and methods that reduce the quantity of data inputted into a machine learning model and associated system by removing both the duplicate data and the highly correlated data. The reduction of the inputted data may retain the accuracy of the machine learning system as well as reduce wasted resources and time.

It would be further desirable to utilize a quantum annealing algorithm running on either a quantum computer or a classical computer to reduce the number of features included in a set of data elements. When using a classical computer, it would be further desirable to utilize a classical optimizer that is programed to execute a simulated quantum annealing algorithm on a classical computing system.

Furthermore, it would be desirable to run the quantum annealing algorithm to reduce the number of features identified within a set of data elements while ensuring that the accuracy level of the output is not significantly compromised. It would be further desirable for the accuracy level to be set by the user because the accuracy level may be problem-dependent. As such, it would be further desirable for the accuracy level to be set based on the identified possibility of a false positive output vis-à-vis the identified possibility of a false negative output.

SUMMARY OF THE DISCLOSURE

Apparatus, methods and systems for detecting non-linear data dependencies in machine learning using hybrid quantum computing is provided.

Statistical machine learning may depend on the availability of large volumes of data to make a prediction. The data may be retrieved from various sources. The data may be structured, such as in a spreadsheet file, or unstructured, such as an image, source, video or portable document format (PDF) file. Many times, the data does not include complete files and, therefore, requires reformatting in order to be used to build or create a machine learning model.

It should be noted that the larger the volume of data used to create a machine learning model, the better the model is in the quality of the prediction. However, larger quantities of data may require large amounts of resources and time to reformat the data in order to make the data advantageous for the machine learning model.

At times, the data may include duplicate data. Many times, when data is being retrieved from different sources, duplicate data may be retrieved. The duplicate data may not add value to the predictability of the model. Furthermore, the duplicate data may amplify the value of the duplicate data thereby reducing the value of the singular data within the machine learning model.

Also, the data may include correlated data. Correlated data may include data which is intrinsically dependent on other data. For example, such data may include one data column which may result from a basic summation of a plurality of other data columns. As such, this correlated data may not add value to the predictability of the model.

Removing both duplicate data and correlated data is an important item within machine learning. There are several tools that detect linear correlation among data sets. Examples of tools may include singular value decomposition (SVD) and Pearson's co-variance (PCV).

However, currently there are no available efficient detection methods that can detect data dependencies when the data is not linearly correlated. Detection of non-linear dependencies may include a global optimization method that may be difficult to implement on a classical computing system. Specifically, using a brute force search mechanism to identify pairwise data dependencies and using entropy for non-linearity detection are computationally expensive using a classical computer.

Therefore, it would be desirable to harness a hybrid quantum optimizer operating on a hybrid quantum computer to detect and remove non-linearly correlated data.

A system and method for detection and removal of non-linearly correlated data using hybrid quantum computing is provided. The system may include and/or utilize a quantum optimizer.

A quantum optimizer, utilizing quantum optimization algorithms, may be used to solve optimization algorithms. Mathematical optimization includes identifying the best solution to a problem, according to a predefined set of criteria, from a set of possible solutions. Many times, an optimization problem may be formulated as a minimization problem, where one tries to minimize an error which depends on the solution. As such, the optimal solution may be the solution that contains the minimal error.

An example of a quantum optimization algorithm may include a quantum approximate optimization algorithm (QAOA). It should be noted that, for combinatorial optimization, the QAOA may have a better approximation ration that any known polynomial time classical algorithm.

An example of a quantum optimizer may be D-Wave produced by D-Wave Systems Inc. D-Wave utilizes quantum annealing methods. Quantum annealing is a process that starts from a quantum-mechanical superposition of all possible states with equal weights. Possible states may also be referred to as candidate states. The system evolves following the time-dependent Schrödinger equation, which is a natural quantum-mechanical evolution of physical systems. The amplitudes of all candidate states keep changing, realizing a quantum parallelism, according to the time-dependent strength of the transverse field, which causes quantum tunneling between states.

If the rate of change of the transverse field is sufficiently slow, the system may stay close to the ground states of the instantaneous Hamiltonian. Such a process may be referred to as adiabatic quantum computing.

If the rate of the change of the transverse field is accelerated, the system may leave the ground state temporarily but produce a higher likelihood of concluding in the ground state of the final problem Hamiltonian. Such a process may be referred to as diabatic quantum computing.

The transverse field may be finally switched off and the system may be expected to reach the ground state of the classical Ising model. The ground state of the Ising model may correspond to the solution to the original optimization problem.

A method that utilizes quantum annealing and/or a quantum optimizer for hyper parameter optimization is provided.

Additionally, it should be noted that, in classical computing methods, detection of dependency among parameters that are non-linearly related is often done by pair-wise comparison using massively parallel computing such as GPU. However, because of a partitioning problem with a GPU, a GPU can only optimize locally and an attempt to find a global optimal may significantly slow down the parallelization.

Therefore, a hybrid computing method that utilizes a classical computer operating with a graphical processing unit (GPU) and a quantum optimizer to build a model that efficiently performs hyper parameter optimization is provided. Methods may include receiving, at a dependency detection subsystem, a set of input parameters and a set of current values assigned to each input parameter included in the set of input parameters. The set of input parameters and the set of current values assigned to each input parameter may relate to a predetermined classification structure.

Methods may include transferring the set of input parameters and the set of current values assigned to each input parameter to the quantum optimizer executing a quantum annealing method. Methods may include identifying, at the quantum optimizer, a set of hyperparameters included in the set of input parameters.

Methods may include reducing, at the quantum optimizer, the set of hyperparameters, using the quantum annealing method. Methods may include returning the reduced set of hyperparameters from the quantum optimizer to the classical computer. Methods may include building, at the classical computer operating with the GPU, a machine learning model using the reduced set of hyperparameters.

Methods may include using the machine learning model operating on the classical computer to classify an unclassified data element within the predetermined classification structure. An example of the unclassified data element may include an email. The predetermined classification structure may classify the email as being a valid email or a malicious email. Other examples of an unclassified data element may include a mortgage application and an investment and securities within a mutual fund.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
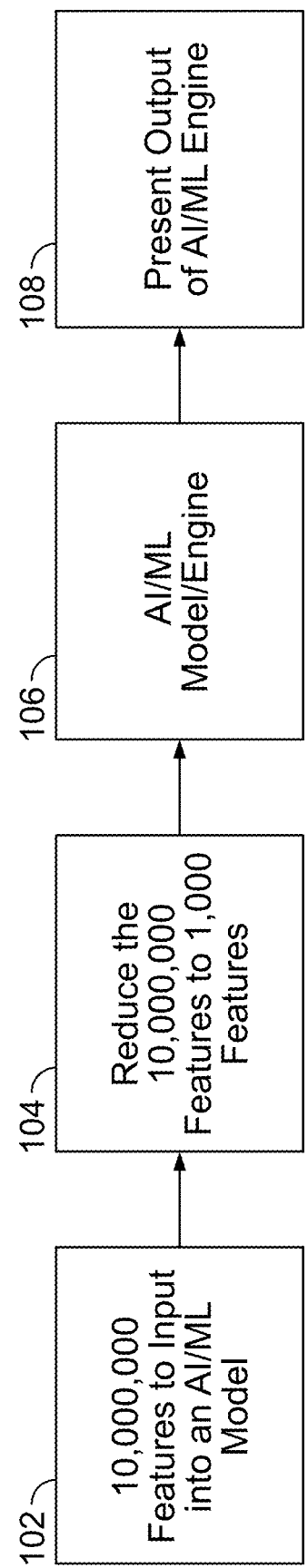
FIG. 1 shows an illustrative diagram in accordance with principles of the disclosure.

Apparatus, methods and systems for detecting non-linear data dependencies in machine learning using hybrid quantum computing is provided. The system may include a machine learning algorithm operating on a classical computer. The system may include a quantum algorithm operating on a hybrid quantum computer. The system may include a hardware processor.

The machine learning algorithm may be operable to receive a data set. The data set may include a plurality of data elements. The machine learning algorithm may identify the plurality of data elements within the data set. The machine learning algorithm may identify one or more features for each data element included in the plurality of data elements. The machine learning algorithm may determine a total number of features for the data set. The machine learning algorithm may input the total number of features into a classical machine learning model. The machine learning algorithm may output, from the classical machine learning model, a first result set.

The quantum algorithm may receive a selection of an accuracy metric. The quantum algorithm may receive the data set. The quantum algorithm may identify one or more features for each data element included in the plurality of data elements. The quantum algorithm may determine the total number of features for the data set. The quantum algorithm may reduce, by a quantum annealing method, based on the accuracy metric, the total number of features to a reduced number of features.

The quantum annealing method may reduce the total number of features to a reduced number of features based on the accuracy metric by reducing features that are correlated over a predetermined threshold of correlation. The quantum annealing method may also reduce the total number of features to a reduced number of features based on the accuracy metric by reducing features that are duplicated over a predetermined threshold of duplication.

The accuracy metric may be selected from a scale of 1 to 100. The accuracy metric may be selected based on a possibility metric associated with the data set. When a possibility of false negative is greater, the accuracy metric may be set toward a first end. When a possibility of false positive is greater, the accuracy metric may be set toward a second end.

The quantum algorithm may input the reduced number of features into a quantum machine learning model. The quantum algorithm may output, from the quantum machine learning model, a second result set.

The hardware processor may compare the first result set to the second result set. The hardware processor may identify that the result set as compared to the second result set obtained a result greater than a predetermined threshold degree of similarity.

In some embodiments, the quantum annealing method is executed by a quantum hardware processor operating with a hardware memory. In other embodiments, the quantum annealing method is executed by a classical optimizer operating on a classical hardware processor operating with a hardware memory. In yet other embodiments, the quantum annealing method is executed by a simulated quantum method executed within a classical hardware processor operating with a hardware memory.

In certain embodiments, apparatus methods and systems may be used to interpret human utterances and/or create a chatbot. The apparatus methods and systems may utilize natural language processing (NLP) and natural language understanding (NLU). As such, the accuracy metric may pinpoint how accurately the human utterances are interpreted. The data set elements may include one or more natural language utterances. Each of the features may include one or more grams. A gram may be a unigram, bigram, trigram or any other suitable gram. A gram may correspond to a word, or any other linguistic component. The reduced number of features may include reduced number of grams. The outputted result from the machine learning model may be used to create a chatbot. The chatbot may interpret human utterances, identify responses to the human utterances and present the identified responses to one or more users.

In some embodiments, apparatus methods and systems may be used to recommend services and/or products to a user. As such, the data set may correspond to historical preferences of the user, services and/or product history of the user, preferences of a plurality of users and service and/or product history of the plurality of users. Furthermore, the first result set and the second result set may include one or more services and/or products to recommend to the user. The accuracy metric may pinpoint how appropriately the services and/or products recommended are suitable for the user. The hardware processor, using a user interface, may recommend the one or more services and/or products to the user.

In yet some embodiments, apparatus methods and systems may be used for three-dimensional image processing. As such, the data set may correspond to text files, image files, audio files and audio/visual files for image processing, human identification and three-dimensional computer scene understanding and interpretation. Furthermore, the one or more features may correspond to components of the text files, image files, audio files and audio/visual files. The first result set and the second result set may correspond to a classification of the text files, image files, audio files and audio/visual files. The classification may classify the files individually or as a combination of files. The accuracy metric may pinpoint how accurately the files are to be classified. A set of images may be processed using the classification of the text files, image files, audio files and audio/visual files individually and the classification of the combination of text files, image files, audio files and audio/visual files.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow chart. Step 102 shows 10,000,000 features to input into an AI/ML model. The features may be retrieved from breaking down the components of one or more data sets. However, in order to process the features without wasting resources and time, it may be desirable to reduce the number of features to 1,000 features, as shown at 104. Examples of features may be columns, or cells, in a table or data object.

Once the features have been reduced, the features may be input into an AI/ML model/engine, as shown at 106. The AI/ML model/engine may process the features and the associated one or more data sets to produce an output. The output of the AI/ML model/engine may be presented to the user, as shown at 108.

Figure 2:
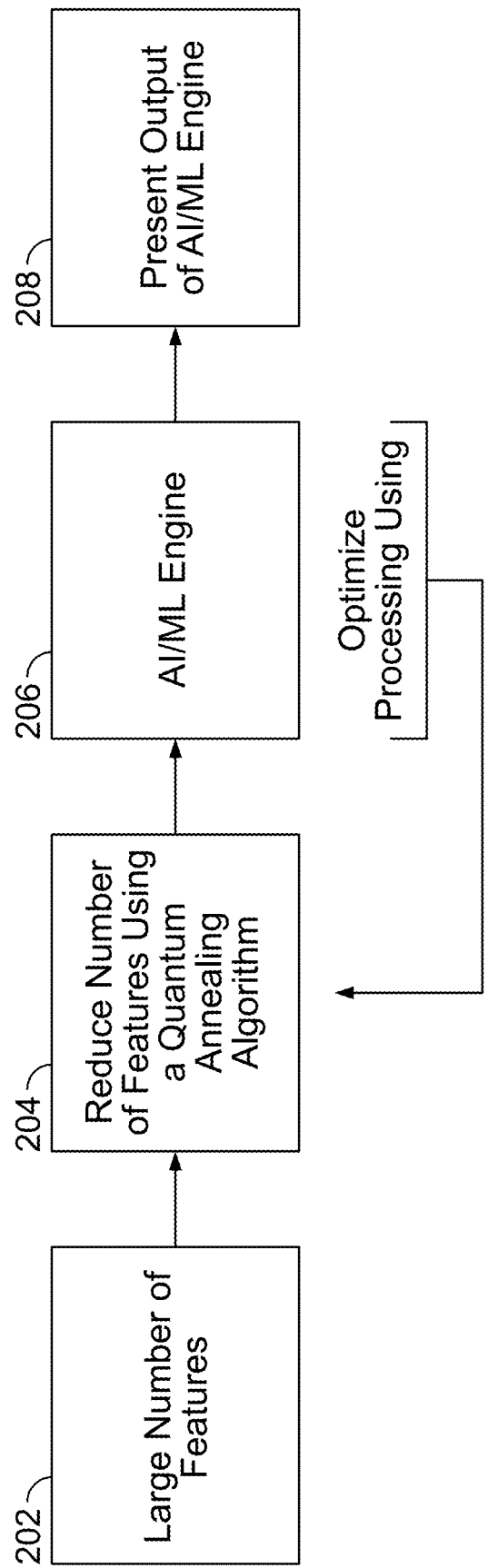
FIG. 2 shows an illustrative flow chart in accordance with principles of the disclosure.

FIG. 2 shows an illustrative flow chart. The illustrative flow chart shows the use of a quantum annealing method to reduce the number of features, also known as dimensions, of a data set, in order to reduce wasted resources and time, while retaining the accuracy level of the output. Examples of features may be columns, or cells, in a table or data object. The accuracy level may be set by the user and/or may be problem-dependent. As such, the accuracy level may be set based on the identified possibility of a false positive output vis-à-vis the identified possibility of a false negative output. As such, critical applications may be set to a high accuracy level, while standard applications may be set to a low accuracy level. When using an accuracy scale of 1-100, an example of a high accuracy level may be 80-100, while an example of a low accuracy level may be 0-20.

Step 202 shows a large number of features have been culled and are prepared to be input into an AI/ML engine. Step 204 shows reducing the number of features using a quantum annealing algorithm. Step 206 shows that the AI/ML engine receives the reduced number of features. As a result of receiving the reduced number of features, the AI/ML engine is optimized. The output of the AI/ML engine is presented to a user, as shown at step 208.

Figure 3:
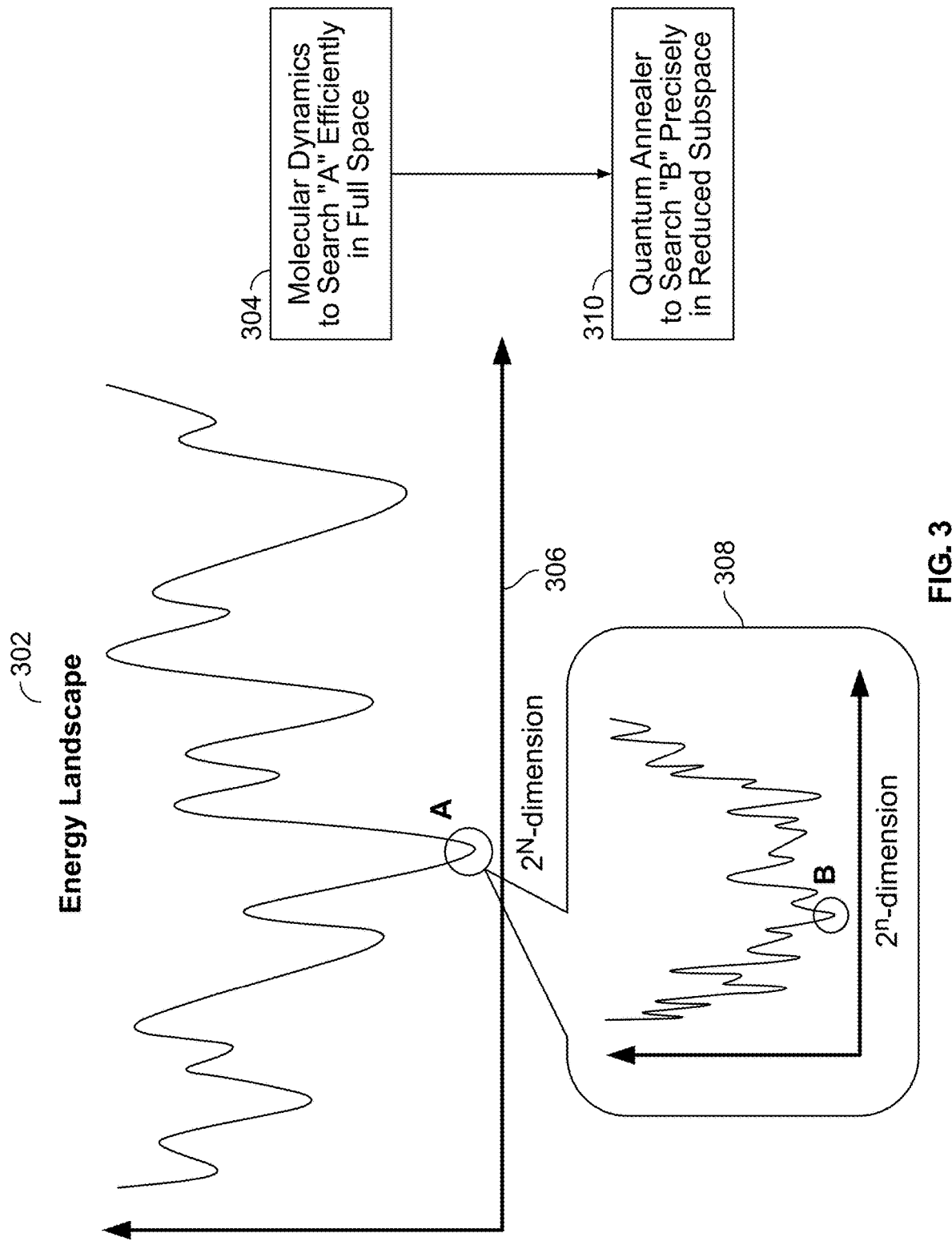
FIG. 3 shows another illustrative flow chart in accordance with principles of the disclosure.

FIG. 3 shows an illustrative diagram. The illustrative diagram shows a two-dimensional energy landscape that resulted from a reduction or optimization algorithm. The lowest energy point within energy landscape 302 may be shown at A. Molecular dynamics to be used to search for, and identify, A within the full space of the energy landscape.

A quantum annealer, or quantum annealing algorithm, may also be used to identify the lowest energy point. As such, at 308, a quantum annealer or quantum annealing algorithm may identify B as the lowest energy point. The quantum annealer may search for, and identify, B precisely in a reduced subspace, as shown at 310.

Figure 4B:
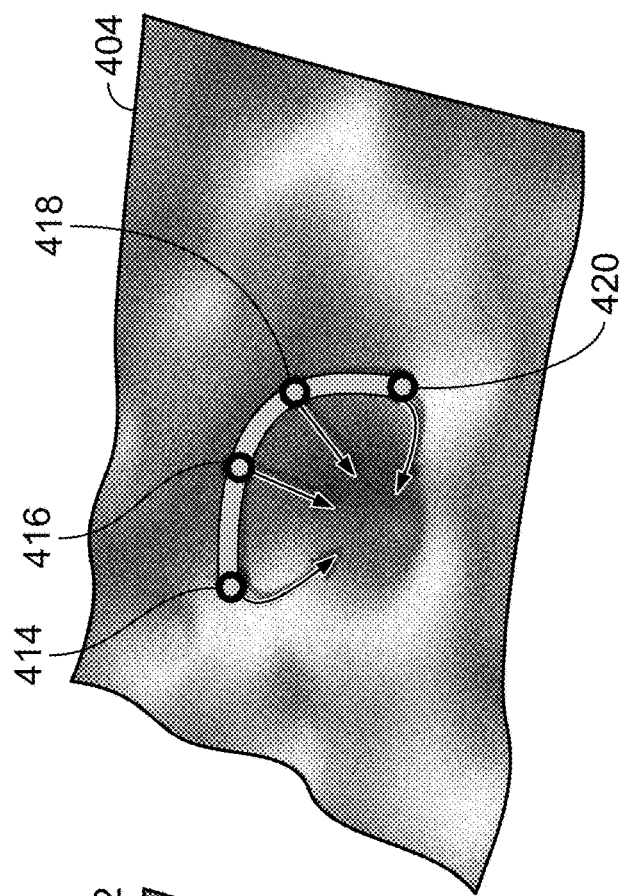
FIG. 4 shows yet another illustrative flow chart in accordance with principles of the disclosure.
Figure 4A:
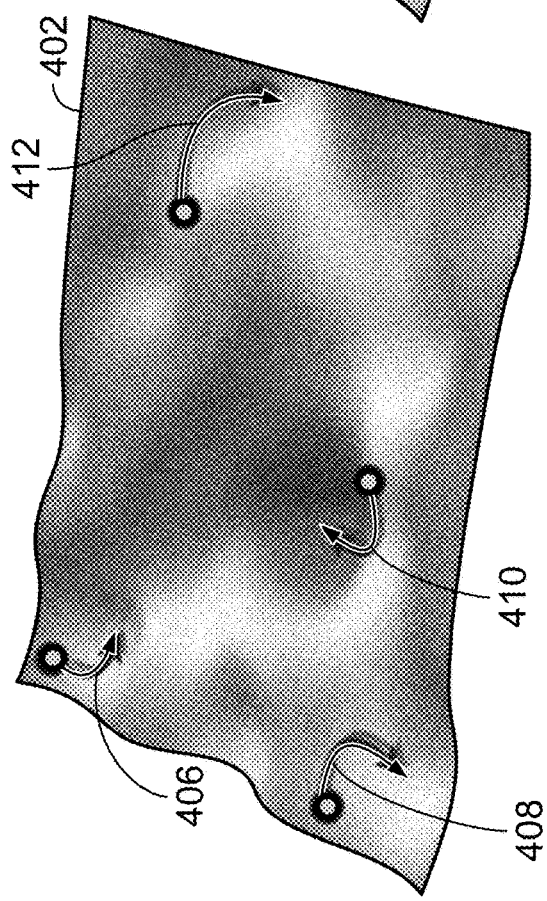

FIGS. 4A and 4B show illustrative diagrams. FIG. 4A shows three-dimensional energy landscapes 402. FIG. 4B shows a three-dimensional energy landscape 404. Both three-dimensional energy landscapes 402 and 404 may be associated with the result of a reduction or optimization algorithm.

Three-dimensional energy landscape 402 may include various attempts to identify the lowest energy point. Each attempt, shown as arrows 406, 408, 410 and 412 may identify a valley within the energy landscape. Upon identification of a plurality of valleys, a system may determine which valley is the lowest. The lowest valley may correspond to the lowest energy point. In three-dimensional energy landscape 402, the lowest energy point may correspond to the valley identified by arrow 410.

Three-dimensional energy landscape 404 may include various attempts to identify the lowest energy point. Each attempt, shown as arrows 414, 416, 418 and 420 may identify the same valley within the energy landscape. As such, the valley identified within the energy landscape may be the lowest energy point.

It should be noted that the lowest energy point within an energy landscape may correspond to the most efficient, or most optimized, method within a landscape of methods.

Thus, systems and methods for detecting non-linear data dependencies in machine learning using hybrid quantum computing are provided. Persons skilled in the art will appreciate that the present invention can be practiced by other than the described embodiments, which are presented for purposes of illustration rather than of limitation. The present invention is limited only by the claims that follow.

What is claimed is:

1. A method for using natural language processing (NLP) and natural language understanding (NLU) to interpret human utterances and create a chatbot, the method involving detecting non-linear data dependencies using hybrid quantum computing, the method comprising:
   receiving a selection of an accuracy metric for accurately interpreting human utterances;
   receiving a data set, the data set comprising a plurality of data elements, said plurality of data elements including one or more natural language utterances, for processing by a machine learning model operating on a machine learning system;
   identifying the plurality of data elements within each data set;
   identifying one or more features for each data element included in the plurality of data elements;
   determining a total number of features for the data set, each of the features comprising one or more grams;
   reducing, by a quantum annealing method, based on the accuracy metric, the total number of features to a reduced number of features, the reduced number of features comprising a reduced number of grams;
   inputting the reduced number of features comprising the reduced number of grams into the machine learning model;
   outputting a result from the machine learning model;
   using the result to create a chatbot;
   using the chatbot to interpret human utterances;
   using the chatbot to identify responses to the human utterances; and
   using the chatbot to present the identified responses.

2. The method of claim 1, wherein the accuracy metric is selected from a scale of 1 to 100.

3. The method of claim 1, wherein the accuracy metric is selected based on a possibility metric associated with the data set, wherein when the possibility of false negative is greater, the accuracy metric is set toward a first end, when the possibility of false positive is greater, the accuracy metric is set toward a second end.

4. The method of claim 1, wherein the quantum annealing method is executed by a quantum hardware processor operating with a hardware memory.

5. The method of claim 1, wherein the quantum annealing method is executed by a classical optimizer operating on a classical hardware processor operating with a hardware memory.

6. The method of claim 1, wherein the quantum annealing method is executed by a simulated quantum method executed within a classical hardware processor operating with a hardware memory.

7. The method of claim 1, wherein the quantum annealing method reduces the total number of features to a reduced number of features based on the accuracy metric by: reducing features that are correlated over a predetermined threshold of correlation; and reducing features that are duplicated over a predetermined threshold of duplication.

* * * * *